(12) United States Patent
Wise et al.

(10) Patent No.: US 6,576,323 B2
(45) Date of Patent: *Jun. 10, 2003

(54) FABRIC CLEANING ARTICLE WITH TEXTURING AND/OR A TACKINESS AGENT

(75) Inventors: Rodney Mahlon Wise, Cincinnati, OH (US); Steven Barrett Rogers, Cincinnati, OH (US)

(73) Assignee: Procter & Gamble, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/508,918

(22) PCT Filed: Sep. 14, 1998

(86) PCT No.: PCT/IB98/01414

§ 371 (c)(1),
(2), (4) Date: Mar. 16, 2000

(87) PCT Pub. No.: WO99/14421

PCT Pub. Date: Mar. 25, 1999

(65) Prior Publication Data

US 2003/0017958 A1 Jan. 23, 2003

Related U.S. Application Data

(60) Provisional application No. 60/077,556, filed on Mar. 11, 1998.

(51) Int. Cl.[7] .............................. B32B 3/00; C11D 17/00
(52) U.S. Cl. ........................ 428/156; 428/172; 510/120; 510/285; 510/291; 510/295; 510/439; 442/76; 442/85; 442/118; 442/152; 442/153; 442/164; 442/218; 442/242; 442/286; 442/394; 15/104.001; 15/209.1; 15/244.1; 8/137; 8/142
(58) Field of Search ....................... 510/439, 120, 510/285, 291, 295; 8/137, 142; 428/156, 172; 15/104.001, 209.1, 244.1; 442/76, 85, 118, 152, 153, 164, 218, 242, 286, 394

(56) References Cited

U.S. PATENT DOCUMENTS 3,686,025 A    8/1972  Morton (List continued on next page.)

FOREIGN PATENT DOCUMENTS

| EP | 0 319 094 A2 | 6/1989 |
| EP | 0 421 163 A2 | 4/1991 |
| EP | 0 429 172 A1 | 5/1991 |
| GB | 2 130 965 A  | 6/1984 |
| GB | 2130965      | * 6/1984 |
| WO | WO 96/30581  | 10/1996 |
| WO | WO 97/32004  | 9/1997 |
| WO | WO 98/44185  | 10/1998 |
| WO | WO 99/16955  | 4/1999 |

*Primary Examiner*—Terrel Morris
*Assistant Examiner*—Hai Vo
(74) *Attorney, Agent, or Firm*—C. Brant Cook; Kim W. Zerby; Steve W. Miller

(57) ABSTRACT

Articles designed to clean/refresh soiled fabrics are improved by means of texturing at least one surface and/or by applying tackiness agents. In use, the articles rub against the fabrics, whereupon lint removed from the fabrics is trapped and retained by the tackiness agent. Refolding of the articles during use is substantially minimized by imparting texture to one or more of the article's surfaces.

12 Claims, 3 Drawing Sheets

U.S. PATENT DOCUMENTS

| | | |
|---|---|---|
| 4,007,300 A | 2/1977 | McQueary |
| 4,336,024 A | 6/1982 | Denissenko et al. |
| 4,797,310 A | 1/1989 | Barby et al. |
| 5,009,747 A | 4/1991 | Viazmensky et al. |
| 5,062,973 A | 11/1991 | Kellett |
| 5,066,413 A | 11/1991 | Kellett |
| 5,173,200 A | 12/1992 | Kellett |
| 5,238,587 A | 8/1993 | Smith et al. |
| 5,292,581 A | 3/1994 | Viazmensky et al. |
| 5,498,478 A * | 3/1996 | Hansen et al. .............. 428/372 |
| 5,547,476 A | 8/1996 | Siklosi et al. |
| 5,591,236 A | 1/1997 | Roetker |
| 5,630,847 A | 5/1997 | Roetker |
| 5,630,848 A | 5/1997 | Young et al. |
| 5,658,651 A | 8/1997 | Smith et al. |
| 5,681,355 A | 10/1997 | Davis et al. |
| 5,687,591 A | 11/1997 | Siklosi et al. |
| 5,762,648 A | 6/1998 | Yeazell |
| 5,789,368 A | 8/1998 | You et al. |
| 5,840,675 A * | 11/1998 | Yeazell ....................... 510/439 |
| 5,942,484 A | 8/1999 | Roetker et al. |

* cited by examiner

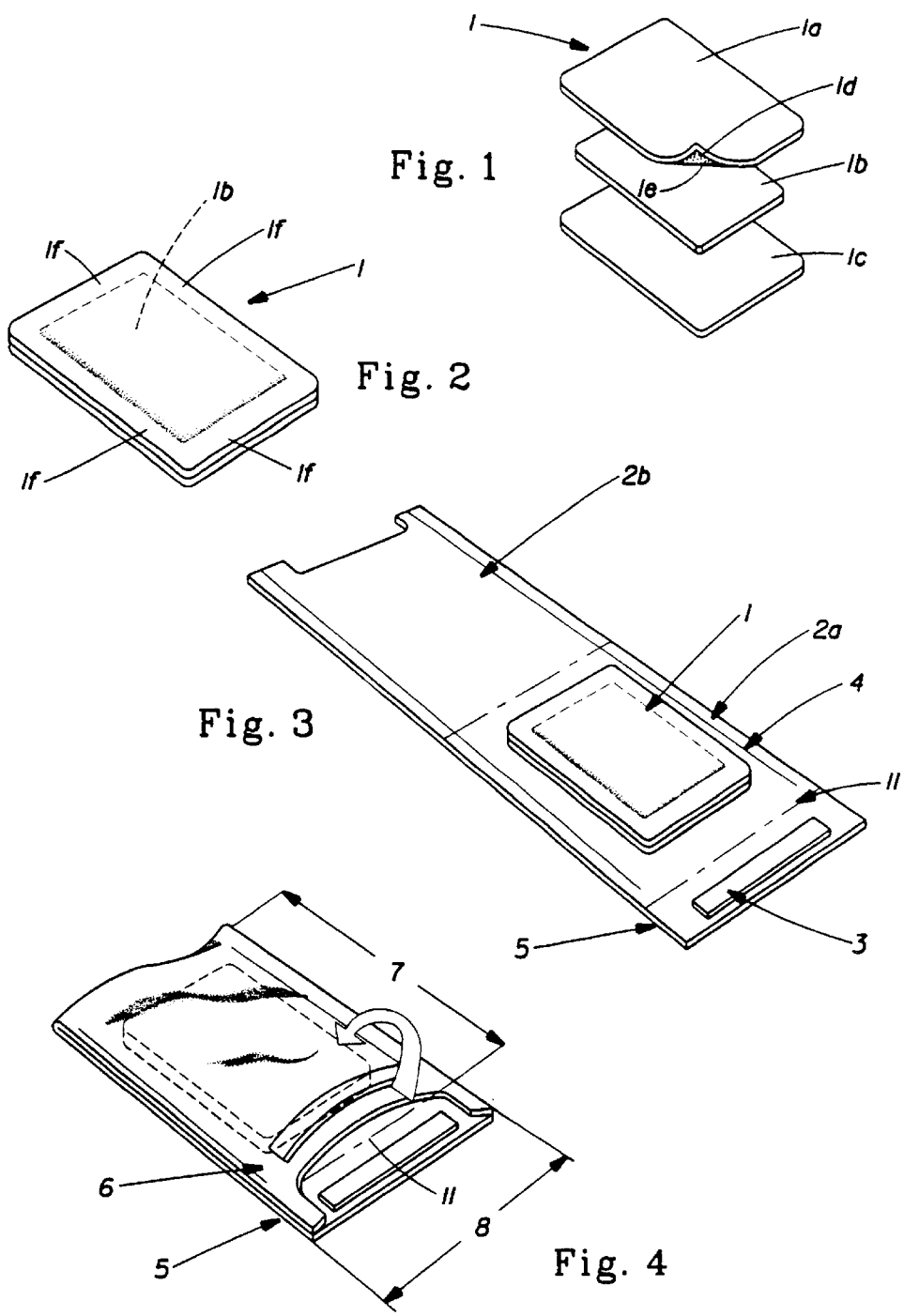

FABRIC CLEANING ARTICLE WITH TEXTURING AND/OR A TACKINESS AGENT

RELATED APPLICATIONS

This application is a 371 of International Application Serial No. PCT/IB98/01414 filed Sep. 14, 1998 which claims priority under 35 U.S.C. §119(e) to U.S. Provisional Application Ser. No. 60/077,556 filed Mar. 11, 1998.

TECHNICAL FIELD

The present invention relates to articles which are designed to clean fabrics in a non-immersion cleaning process.

BACKGROUND OF THE INVENTION

By classical definition, the term "dry cleaning" has been used to describe processes for cleaning textiles using non-aqueous solvents. Dry cleaning is an old art, with solvent cleaning first being recorded in the United Kingdom in the 1860's. Typically, dry cleaning processes are used with garments such as woolens which are subject to shrinkage in aqueous laundering baths, or which are judged to be too valuable or too delicate to subject to aqueous laundering processes. Various hydrocarbon and halocarbon solvents have traditionally been used in immersion dry cleaning processes, and the need to handle and reclaim such solvents has mainly restricted the practice of conventional dry cleaning to commercial establishments.

Together with the soil and stain removal aspects of a typical dry cleaning process, there is also a consumer need for what can be termed fabric "refreshment" compositions and processes. Thus, fabrics which have lint, hair or other solid debris clinging to the fabric surface, and which may have adsorbed malodors, have become wrinkled, or have otherwise lost their fresh appearance, are often subjected to conventional commercial dry cleaning processes mainly to reestablish their freshness aspect.

Attempts have been made to provide in-home dry cleaning systems. One type of in-home system for cleaning and refreshing garments comprises a carrier sheet containing various cleaning agents and a plastic bag. The garments are placed in the bag together with the sheet, and then tumbled in a conventional clothes dryer. In a commercial embodiment, multiple single-use flat sheets and a single multi-use plastic bag are provided in a package. Unfortunately, such in-home processes are sub-optimal with respect to the removal of lint and other solid debris from fabric surfaces.

For purposes of convenience and economics, the carrier sheet for use in these home dry cleaning processes is often folded one or more times to allow for smaller shipping and storage packaging. But in use, these carrier sheets tend to refold along the crease lines resulting in reduction in the exposed surface area of the sheet. With less exposed surface area the efficiency of these sheets is substantially reduced, resulting in reduced cleaning and refreshing.

PCT Application US 96/02886, published Oct. 3, 1996, to Maxwell Davis, discloses the problems associated with such sheet re-folding in an in-home, non-immersion cleaning/refreshment process. The patentee describes the use of macroscopic holes punched through the sheets to help prevent re-folding. However, punching holes in the sheets requires an extra processing step during manufacture, at added expense. U.S. Pat. No. 5,630,848, issued May 20, 1997 to Young, Bavely, Roetker & Davis, discloses the use of HYDRASPUN® sheets and bespeaks the advantage that re-folding is minimized, as compared with conventional non-wovens. However, the re-fold problem is not completely solved. Moreover, when the HYDRASPUN® sheets are enrobed in a fibrous coversheet, as disclosed hereinafter, re-folding can again become problematic. Hence, there remains a continuing need for carrier sheets and methods of forming these sheets which minimizes refolding of the sheets during use.

The present invention provides improved pick-up and removal of lint and other particulate matter from fabrics which are being cleaned and/or refreshed, or fugitive lint in the bag, and substantially reduces the occurrence of refolding of the carrier sheet. These benefits are secured when a carrier sheet that releasably contains a cleaning/refreshment composition is textured, is covered with a coversheet material that is textured and/or which is treated with a tackiness agent, as disclosed hereinafter. In a preferred mode, the tackiness agent is placed on the inner surface of the coversheet, thereby avoiding damage to the fabrics being cleaned/refreshed.

BACKGROUND ART

WO 97/00993A1, published Jan. 9, 1997 to Weller, et al.; WO 97/00990A2, published Jan. 9, 1997 to Tyerech, et al.; GB 2,302,553A, published Jan. 22, 1997 to Telesca, et al.; GB 2,302,878A, published Feb. 5, 1997 to Weller, et al.; and GB 2,302,879A, published Feb. 5, 1997 to Sidoti, et al. all relate to in-dryer fabric cleaning. U.S. Pat. No. 4,532,722, issued to S. H. Sax, Aug. 6, 1985, relates to a fabric conditioning device for use in a laundry dryer. A peracid-containing dry cleaning composition is described in U.S. Pat No. 4,013,575, issued to H. Castrantas, et al., Mar. 22, 1977. Dry cleaning processes are disclosed in: U.S. Pat. No. 5,547,476 issued Aug. 20, 1996 to Siklosi & Roetker; U.S. Pat. No. 5,591,236 issued Jan. 7, 1997 to Roetker; U.S. Pat. No. 5,630,847 issued May 20, 1997 to Roetker; U.S. Pat. No. 5,630,848 issued May 20, 1997 to Young, et al.; U.S. Pat. No. 5,632,780 issued May 27, 1997 to Siklosi; EP 429,172A1, published May 29, 1991, Leigh, et al.; and in U.S. Pat. No. 5,238,587, issued Aug. 24, 1993, Smith, et al. Other references relating to dry cleaning compositions and processes, as well as wrinkle treatments for fabrics, include: GB 1,598,911; and U.S. Pat. Nos. 4,126,563, 3,949,137, 3,593,544, 3,647,354; 3,432,253 and 1,747,324; and German applications 2,021,561 and 2,460,239, 0,208,989 and 4,007,362. Cleaning/pre-spotting compositions and methods are also disclosed, for example, in U.S. Pat. Nos. 5,102,573; 5,041,230; 4,909,962; 4,115,061; 4,886,615; 4,139,475; 4,849,257; 5,112,358; 4,659,496; 4,806,254; 5,213,624; 4,130,392; and 4,395,261. Sheet substrates for use in a laundry dryer are disclosed in Canadian 1,005,204. U.S. Pat. Nos. 3,956,556 and 4,007,300 relate to perforated sheets for fabric conditioning in a clothes dryer. U.S. Pat. No. 4,692,277 discloses the use of 1,2-octanediol in liquid cleaners. See also U.S. Pat. Nos. 3,591,510; 3,737,387; 3,764,544; 3,882,038; 3,907,496; 4,097,397; 4,102,824; 4,336,024; 4,594,362; 4,606,842; 4,758,641; 4,797,310; 4,802,997; 4,943,392; 4,966,724; 4,983,317; 5,004,557; 5,062,973; 5,080,822; 5,173,200; EP 0 213 500; EP 0 261 718; G.B. 1,397,475; WO 91/09104; WO 91113145; WO 93125654 and Hunt, D. G. and N. H. Morris, "PnB and DPnB Glycol Ethers", *HAPPI*, April 1989, pp. 78–82.

SUMMARY OF THE INVENTION

The present invention encompasses an article for treating fabrics, comprising:

a) an absorbent substrate having a first surface and a second surface;

b) a liquid cleaning/refreshment composition releasably absorbed in the substrate;

c) the substrate being wholly (preferred) or at least partly covered by a coversheet, preferably a fibrous coversheet, which is permeable to the cleaning/refreshment composition in the liquid or vapor state, the coversheet having an external surface and an internal surface, the article comprising a tackiness agent which can be on the surface of the absorbent carrier substrate, on the coversheet, or on both the substrate and the coversheet.

In a preferred embodiment of this invention there is provided an article for treating fabrics, comprising:

a) an absorbent substrate having a first surface and a second surface;

b) a liquid cleaning/refreshment composition releasably absorbed in the substrate; and c) the substrate being wholly or at least partly covered by a coversheet which has an external surface and an internal surface and which is permeable to the cleaning/refreshment composition in the liquid or vapor state; and wherein at least one of the cover sheet and the absorbent substrate have a texture imparting pattern of indentations on at least one of their surfaces, preferably the article also comprises a tackiness agent.

In another preferred mode the coversheet substantially envelops the substrate. In a highly preferred mode, the tackiness agent is on the internal surface of the coversheet.

The cleaning/refreshment composition used herein can comprise water and a member selected from the group consisting of organic surfactants, organic solvents, auxiliary cleaning agents, and mixtures thereof. In a preferred mode, the cleaning/refreshment composition comprises water and a surfactant, especially a nonionic surfactant, e.g. an ethoxylated alcohol or ethoxylated alkyl phenol surfactant.

The invention thus provides articles of manufacture in sheet form which are specifically adapted to clean and/or refresh fabrics in a hot air clothes dryer, comprising:

(a) a core element which comprises a liquid absorbing carrier in sheet form;

(b) a liquid cleaning/refreshment composition comprising at least about 95%, by weight, of water releasably absorbed in the core element;

(c) a permeable coversheet which enrobes the outer surfaces of the core element, the article containing the tackiness agent. In a preferred embodiment, the liquid absorbing carrier and/or the coversheet has a texture imparting pattern of indentations on at least one of the surfaces of the liquid absorbing carrier and/or the coversheet.

Preferably the cleaning/refreshment composition comprises up to about 2%, by weight, of a nonionic surfactant.

The invention also provides a cleaning/refreshment process for treating a fabric, comprising the overall steps of:

(a) placing the fabric together with an article according to this invention in a containment bag, preferably of the vapor-venting type;

(b) placing the bag in a hot air clothes dryer and operating the dryer with heat and tumbling; and (c) removing the fabric from the bag.

It has surprisingly been found that by applying texture to the absorbent substrate, the coversheet, or both, the cleaning article made therefrom rarely refolds during use. The cleaning article carries the cleaning/refreshing solution into the bag, and cleaning and refreshing of the fabrics occurs only after the solution evaporates from the sheet. Refolding of the cleaning article diminishes the exposed surface area of the article, which in turn diminishes the rate of evaporation of the solution, resulting in less cleaning/refreshing vapors in the bag. By avoiding refolding the textured cleaning articles of this invention are substantially more efficient at delivering the cleaning/refreshing solution to the fabrics being cleaned and refreshed.

All percentages, ratios and proportions herein are by weight, unless otherwise specified. All documents cited are, in relevant part, incorporated herein by reference.

BRIEF DESCRIPTION OF THE DRAWINGS

FIG. 1 is an exploded view of the article herein in a pre-assembled state.

FIG. 2 is a perspective of an assembled cleaning/refreshing article (1) of the present invention in sheet form.

FIG. 3 is a perspective of the article loosely resting on a notched, vapor-venting containment bag which is in a pre-folded condition.

FIG. 4 is a perspective of the article within the bag which is ready to receive the fabrics to be treated in a hot air clothes dryer.

DETAILED DESCRIPTION OF THE INVENTION

Figure 5:
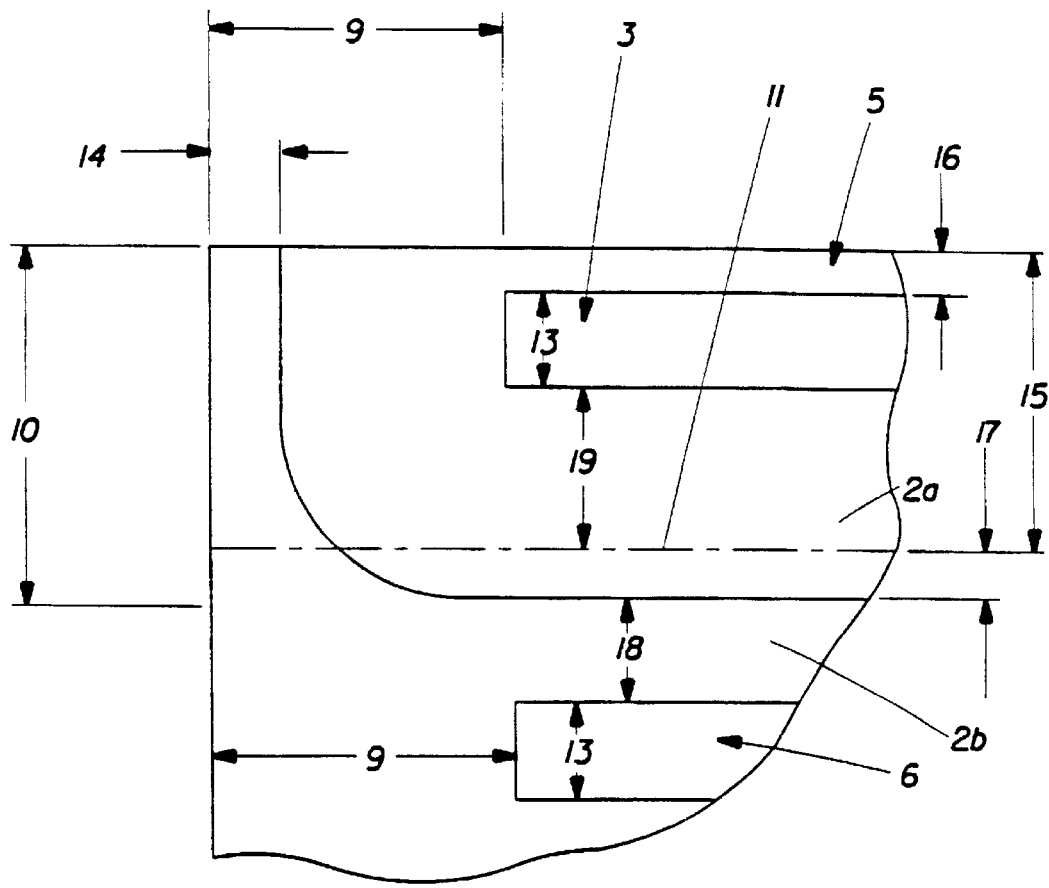
FIG. 5 is a partial view of the notched wall of the bag and its disposition relative to the closure flap.

The individual materials employed to assemble the fabric cleaning/refreshment articles of the present invention are commercially available. The terms used herein to describe such materials have their conventional meanings. For purposes of clarity, certain terms used herein are defined as follows.

By "tackiness agent", "tackifying agent" or "tackifier" herein is meant a material which is used to impart adhesive properties to otherwise substantially non-adhesive materials, i.e., the coversheet herein. Said another way, such agents make the surface of the coversheet more sticky and adherent to solid matter such as lint, hair, dust, pollen, and the like.

By "tack" herein is meant the pull resistance exerted by a material adhering to two separating surfaces. Thus, in the present invention the "tack" of the surfaces of the articles means the ability of the articles to pull, or otherwise remove, solid materials away from the surfaces across which the article passes, rubs, or otherwise contacts.

By "internal surface" of the coversheet herein is meant that surface which faces the absorbent substrate. By "external surface" herein is meant that surface which faces away from the substrate, i.e., faces outwardly from the article. It is this face which comes in direct contact with the fabrics being treated.

By "texture" herein is meant that at least one surface of the article, that is, at least one of the surfaces of the coversheet or the absorbent substrate, comprises macroscopic indentations. Preferably these indentations are in a pattern, for example a crisscrossing pattern of diagonal lines, or an intersecting pattern of parallel horizontal and vertical lines. Moreover, random indentations, for example, dimples of the same or varying size, are acceptable for use in the present invention. As will be apparent to those skilled in the art, "indentation" is a relative term. That is, an indentation on one surface of a flat sheet may result in a protrusion on the opposite side of the sheet. Hence, as used herein "indentation" is intended to encompass both indentations and protrusions, provide that they impart some macroscopic texture to at least one surface of the articles of this invention.

The indentations which give rise to the texture can be applied by any appropriate means. For example, one or more of the substrates or coversheets to be textured can be pulled over a roller having a raised pattern on its outer surface such that the pattern is imparted to the substrate or coversheet material. A second roller can be used to apply pressure to the sheet material to insure the texture is sufficiently pronounced. Other methods of imparting texture to the cleaning articles of this invention will be known to those skilled in the art. While not wanting to be bound be any one theory, it is believed that the texture imparting indentations act like small hinges when applied to a surface of the cleaning/refreshment articles of the present invention. When these small hinges intersect a hard crease, such as the creases formed when the articles of this invention are folded for packaging, the crease becomes more pliable and the sheet is much less likely to refold along the crease.

By "cleaning" herein is meant the removal of soils and stains from fabrics. By "refreshment" herein is meant the removal of malodors and/or wrinkles from the overall fabrics, or the improvement of their overall appearance, other than primarily removing soils and stains, although some soil and stain removal can occur concurrently with refreshment. Typical fabric cleaning refreshment/ compositions herein can comprise more water (95–99.9%, preferably greater than 95% up to about 99%) and fewer cleaning ingredients than conventional cleaning or prespotting compositions.

Carrier—When used in the in-dryer step of the present process, the cleaning/refreshment compositions are used in combination with an absorbent carrier substrate, which is sometimes referred to herein as an "absorbent substrate". The carrier releasably contains the compositions. By "releasably contains" means that the compositions are effectively released from the carrier onto the soiled fabrics as part of the non-immersion cleaning/fabric refreshment processes herein. This release occurs by contact between the substrate and the fabrics and/or by volatilization of the composition from the carrier substrate through the vapor-permeable coversheet, or by a combination of vapor and liquid transfer.

It is highly preferred that the carrier be in the form of an integral pad or sheet which substantially maintains its structural integrity throughout the process. Such pads or sheets can be prepared, for example, using well-known methods for manufacturing non-woven sheets, paper towels, fibrous batts, cores for bandages, diapers and catamenials, and the like, using materials such as wood pulp, cotton, rayon, polyester fibers, and mixtures thereof. Woven cloth pads may also be used, but are not preferred over non-woven pads due to cost considerations. Integral carrier pads or sheets may also be prepared from natural or synthetic sponges, foams, and the like.

The carriers are designed to be safe and effective under the intended operating conditions of the present process. The carriers must not be flammable during the process, nor should they deleteriously interact with the cleaning or refreshment composition or with the fabrics being cleaned. In general, non-woven polyester-based pads or sheets are quite suitable for use as the carrier herein.

The carrier used herein is most preferably non-linting. By "non-linting" herein is meant a carrier which resists the shedding of visible fibers or microfibers onto the fabrics being cleaned, i.e., the deposition of what is known in common parlance as "lint". A carrier can easily and adequately be judged for its acceptability with respect to its non-linting qualities by rubbing it on a piece of dark blue woolen cloth and visually inspecting the cloth for lint residues.

The non-linting qualities of sheet or pad carriers used herein can be achieved by several means, including but not limited to: preparing the carrier from a single strand of fiber; employing known bonding techniques commonly used with nonwoven materials, e.g., point bonding, print bonding, adhesive/resin saturation bonding, adhesive/resin spray bonding, stitch bonding and bonding with binder fibers. If the tackiness agent is applied to the external surfaces of the substrate, this further reduces any tendency to shed lint.

The size of the carrier should not be so large as to be unhandy for the user. Typically, the dimensions of the carrier will be sufficient to provide a macroscopic surface area (both sides of the carrier) of at least about 360 $cm^2$, preferably in the range from about 360 $cm^2$ to about 3000 $cm^2$. For example, a generally rectangular carrier may have the dimensions (X-direction) of from about 10 cm to about 35 cm, and (Y-direction) of from about 18 cm to about 45 cm.

The carrier is intended to contain a sufficient amount of the cleaning/refreshment compositions to be effective for their intended purpose. The capacity of the carrier for such compositions will vary according to the intended usage. For example, pads or sheets which are intended for a single use in cleaning/refreshing fabrics will require less capacity than such pads or sheets which are intended for multiple uses. For a given type of carrier the capacity for the cleaning or refreshment composition will vary mainly with the thickness or "caliper" (Z-direction; dry basis) of the sheet or pad. For purposes of illustration, typical single-use polyester sheets used herein will have a thickness in the range from about 0.1 mm to about 0.7 mm and a basis weight in the range from about 30 $g/m^2$ to about 100 $g/m^2$. Typical multi-use polyester pads herein will have a thickness in the range from about 0.2 mm to about 1.0 mm and a basis weight in the range from about 40 $g/m^2$ to about 150 $g/m^2$. Open-cell sponge sheets will range in thickness from about 0.1 mm to about 1.0 mm. Of course, the foregoing dimensions may vary, as long as the desired quantity of the cleaning/refreshment composition is effectively provided by means of the carrier.

A preferred carrier herein comprises a binderless (or optional low binder), hydroentangled absorbent material, especially a material which is formulated from a blend of cellulosic, rayon, polyester and optional bicomponent fibers. Such materials are available from Dexter, Non-Wovens Division, The Dexter Corporation as HYDRASPUN®, especially Grades 10244 and 10444. The manufacture of such materials forms no part of this invention and is already disclosed in the literature. See, for example, U.S. Pat. Nos. 5,009,747, Viazmensky, et al., Apr. 23, 1991 and 5,292,581, Viazmensky, et al., Mar. 8, 1994, incorporated herein by reference. Preferred materials for use herein have the following physical properties.

| Dexter, Grade 10244 | | | |
|---|---|---|---|
| | Units | Targets | Optional Range |
| Basis Weight | gm/m² | 55 | 35–75 |
| Thickness | microns | 355 | 100–1500 |
| Density | gm/cc | 0.155 | 0.1–0.25 |
| Dry Tensile | gm/25 mm | | |
| MD | | 1700 | 400–2500 |
| CD | | 650 | 100–500 |
| Wet Tensile | gm/25 mm | | |
| MD* | | 700 | 200–1250 |
| CD* | | 300 | 100–500 |
| Brightness | % | 80 | 60–90 |
| Absorption Capacity | % | 735 | 400–900 (H₂O) |
| Dry Mullen | gm/cm² | 1050 | 700–1200 |

*MD - machine direction; CD - cross direction

As disclosed in U.S. Pat. Nos. 5,009,747 and 5,292,281, the hydroentangling process provides a nonwoven material which comprises cellulosic fibers, and preferably at least about 5% by weight of synthetic fibers, and requires less than 2% wet strength agent to achieve improved wet strength and wet toughness.

Coversheet—The coversheets which are employed herein to enrobe the carrier sheet are distinguished from the carrier substrate sheets, inasmuch as the coversheets are relatively non-absorbent to the liquid cleaning/refreshment compositions as compared with the carrier sheets. The coversheets are constructed from hydrophobic fibers which tend not to absorb, "wick" or otherwise promote the transfer of fluids. While fluids can pass through the void spaces between the fibers of the coversheet, this occurs mainly when excessive pressure is applied to the article. Thus, under typical usage conditions the coversheet provides a physical barrier which keeps the absorbent carrier, which is damp from its load of aqueous cleaning/refreshment composition, from coming into direct contact with the fabrics being treated. Yet, the permeable coversheet does allow vapor transfer of the cleaning/refreshment composition from the carrier through the coversheet and into the containment bag, and thence onto the fabrics being treated.

In addition to providing the barrier function, the present invention now provides means whereby the coversheet also serves as a "trap" for lint and other particulate matter which is desirably removed from the fabrics being treated.

One type of coversheet herein comprises a fibrous, permeable nonwoven or woven fabric. Such nonwoven or woven fibrous coversheets offer advantages over formed-film type coversheets known in the catamenials art. For example, formed-film coversheets (as described hereinafter) are often manufactured by hydroforming processes which are particularly suitable with polymer films such as polyethylene. While polyethylene can be used herein, there is some prospect that, due to its lower melting point, high dryer temperatures can cause its softening and/or melting in-use. This is particularly true if the article herein were to be released from the containment bag and fall into the hot dryer drum. While it is possible to prepare formed-film topsheets using nylon, polyester or other heat resistant polymeric sheets, such manufacture becomes somewhat more difficult and, hence, more expensive.

It has now also been determined that the coversheet herein should be of a thickness which effectively provides the physical barrier function. Even though made from hydrophobic fibers, if the coversheet is too thin, fluid passage can occur under the intended usage conditions. Accordingly, it has now been determined that the thickness of the fibrous coversheet should preferably be at least about 7 mils (0.18 mm), preferably from about 0.2 mm to about 0.6 mm. It has also been determined that the fibers used in the coversheet are preferably hydrophobic and preferably have a melting point above about 204° C.

Fibrous coversheets for use herein can readily be made from non-heat resistant fibers such as polyethylene. However, it has now been determined that preferred fibrous coversheets can be prepared using nylon (especially nylon-6), polyester, and the like, heat-resistant fibers which can withstand even inadvertent misuse in the present process. The flexible, cloth-like, permeable topsheets made therefrom are conventional materials in the art of nonwoven and woven fabric making, and their manufacture forms no part of the instant invention. Nonwoven fabrics for use as coversheets are available commercially from companies such as Reemay, Inc., Hickory, Tenn. Such coversheets also pick up solid dust particles, vagrant lint and other fibers from the fabrics being treated in the present process, thereby enhancing the overall clean/refreshed appearance of the fabrics following the treatment herein.

Such nonwoven or woven fibrous sheet materials can be used in a flat single layer or as multiple layers as the coversheet for the absorbent carrier core herein. In another embodiment, the absorbent core carrying the cleaning/refreshment composition is enrobed in a polyester or polyamide fibrous coversheet which has been ring rolled or otherwise crimped to provide three dimensional bulk. Optionally, this coversheet may be further covered by a second coversheet in an uncrimped configuration.

Such fibrous, preferably heat resistant and, most preferably, hydrophobic, coversheets thus provide various embodiments of the article herein. Suitable combinations can be employed, according to the desires of the manufacturer, without departing from the spirit and scope of the invention. If desired, the coversheet can be provided with macroscopic fenestrations through which the lint, fibers or particulate soils can pass, thereby further helping to entrap such foreign matter inside the article, itself.

A typical spun-bonded fibrous coversheet herein is commercially available from Reemay and has the following characteristics.

(a) Fabric Type—Non-woven, semi-dull, whitened homopolymer 100% virgin, spun-bonded polyester.

(b) Fiber Type—6.0 Denier straight, tri-lobal continuous fiber, copolymer polyester.

| Web Properties | Target | Range |
|---|---|---|
| a) Basis weight, roll average oz/yd² | 0.54 | 0.52 to 0.59 |
| b) Thickness | 8 mil | 7–8 mil |
| c) Fuzz level | | |
| As measured by Reemay sled/drag method based on 0–5 scale. 5 being no fuzz level. | | |
| Belt side | 2.5 | 5.0 | 1.8 |
| Jet side | 3.4 | 5.0 | 2.6 |

As noted above, another type of coversheet which can be used with the articles herein comprises the apertured "formed film" coversheets known in the art and from commercial use on catamenials. Apertured formed films are pervious to the liquid cleaning and/or refreshment compositions and vapors thereof, and yet non-absorbent. Thus, the surface of the formed film which is in contact with the fabrics remains relatively dry, thereby reducing water spotting and dye transfer. As with the fibrous coversheets, the apertured formed films capture and retain lint, fibrous matter such as pet hair, and the like, from the fabric being treated, thereby enhancing the cleaning/refreshment benefits afforded by the present articles. Suitable formed films are described in U.S. Pat. No. 3,929,135, entitled "Absorptive Structure Having Tapered Capillaries", issued to Thompson on Dec. 30, 1975; U.S. Pat. No. 4,324,246, entitled "Disposable Absorbent Article Having A Stain Resistant Coversheet", issued to Mullane and Smith on Apr. 13, 1982; U.S. Pat. No. 4,342,314, entitled "Resilient Plastic Web Exhibiting Fiber-Like Properties", issued to Radel and Thompson on Aug. 3, 1982; and U.S. Pat. No. 4,463,045, entitled "Macroscopically Expanded Three-Dimensional Plastic Web Exhibiting Non-Glossy Visible Surface and Cloth-Like Tactile Impression", issued to Ahr, Louis, Mullane and Ouellete on Jul. 31, 1984; U.S. Pat. No. 4,637,819 issued to Ouellette, Alcombright & Curro on Jan. 20, 1987; U.S. Pat. No. 4,609,518 issued to Curro, Baird, Gerth, Vernon & Linman on Sep. 2, 1986; U.S. Pat. No. 4,629,642 issued to Kemstock on Dec. 16, 1986; and EPO Pat. No. 0,165,807 of Osborn published Aug. 8, 1989; all of which are incorporated herein by reference. The apertures in such coversheets may be of uniform size or can vary in size, as disclosed in the foregoing published documents, which can be referred to for technical details, manufacturing methods, and the like. Such apertures may also vary in diameter in the manner of so-called "tapered capillaries". Such formed-film cover-sheets with tapered capillary apertures preferably are situated over the carrier sheet such that the smaller end of the capillary faces the carrier sheet and the larger end of the capillary faces outward. This helps prevent bulk liquid transfer, thereby minimizing water spotting on the fabrics being treated. In the main, apertures in the formed film coversheets used herein can have diameters in the range of from about 0.1 mm to about 1 mm, or as disclosed in the aforesaid patent references.

As shown in FIG. 1, an article (1) of the present type can be assembled as a laminate comprising a topmost fibrous sheet (1a), an absorbent carrier sheet as the core (1b) and a bottommost fibrous sheet (1c). The combination of topsheet and bottomsheet comprises the "coversheet" in the preferred embodiment of the articles herein. In this illustrated embodiment, the internal surfaces (1d) of the topmost fibrous sheet is coated with the tackiness agent (1e). In another embodiment, both the top and bottom sheets can contain the tackiness agent. In yet another embodiment, the tackiness agent can be on the outer surface of the coversheet or on the outer surface of the carrier sheet (1b). As described above, texture imparting indentations can be placed on any or all of the surfaces of the fibrous sheet 1(a), core (1b), or fibrous sheet (1c).

The assembled laminate article (1) is shown in FIG. 2. FIG. 2 also shows the bond (1f) which extends around the periphery of the article. The purpose of this bond is to ensure that the absorbent carrier core maintains its original configuration relative to the coversheet when the article is being used in the manner of this invention. Stated simply, it has been discovered that if the absorbent sheet which comprises the core is not bonded to the "envelope" provided by the coversheet in-use, the carrier sheet tends to crumple and bunch-up inside the coversheet. This can interfere with the delivery of the cleaning/refreshment composition to the fabrics being treated.

Moreover, it has also been discovered that it is not preferred to tightly bond the coversheet to the carrier sheet across the entire face of the carrier sheet. Tightly bonding the coversheet closely to the carrier sheet can allow some liquid transfer to occur through the coversheet. Accordingly, the carrier sheet is preferably bonded to the coversheet only in discrete areas. In one embodiment as shown in FIG. 2, this bonding is only around the periphery of the article. In another embodiment, spot-bonding at discrete areas across the face of the article can be employed. Various other bond patterns can be used. Preferably, the bonding is done at no more than about 50% of the area of the article, more preferably no more than about 10% of the area of the article, most preferably no more than about 1% of the area of the article.

Tackiness Agents—The tackiness agents employed herein are materials which are well-known in the art and are available commercially. Many such agents are proprietary chemicals whose compositions are maintained as trade secrets. If desired, the manufacturer of the articles herein can formulate various tackiness agents by referring to standardized texts and formularies. However, this is an unnecessary step, inasmuch as commercial tackiness agents are entirely suitable for the purposes of this invention. Among such tackiness agents available under Trade Names there can be mentioned the following, which are given by way of illustration for the convenience of the manufacturer of the articles herein and not by way of limitation: ELMER'S SPRAY ADHESIVE; SUPER 77, available from the 3M Company and Fuller's Roll-on Adhesive HL-2115-X.

In use, the tackiness agent is applied to the surface of the fibrous coversheet employed herein. It has been determined experimentally that some tackiness agents may be sufficiently aggressive that they can actually remove fibers from the fabric more aggressively than is desired for simple cleaning purposes. Said another way, the more aggressive tackiness agents can actually degrade the garments by removing fibers from their weave. This, of course, would be unacceptable in an article which is employed for cleaning/refreshing garments. In order to overcome this unexpected problem, it has now been determined that it is preferred to apply the tackiness agent on the inner surface of the coversheet material. During use for cleaning/refreshment purposes, lint, extraneous fibrous material and other miscellaneous particulate detritus pass through the coversheet and become entrapped on the inside surface of the coversheet by the layer of tackiness agent. When used in this manner, the tackiness agent holds the solid detritus quite satisfactorily, yet does not degrade the weave of the fabric per se.

The amount of tackiness agent can vary with the type of agent selected. In general, from about 200 mg to about 70,000 mg of tackiness agent per square meter of coversheet is employed. This can vary with the agent selected. For example, with ELMER'S (E-452), the preferred amount is about 4000 mg/m$^2$, with a range from about 265 to about 26,500 mg/m$^2$. With 3M's SUPER 77 the preferred amount is about 6200 mg/m$^2$, with a range from about 620 to about 62,000 mg/m$^2$. Accordingly, it will be seen that the present invention employs an "effective amount" of the tackiness agent which is an amount sufficient to retain lint and fibrous and/or particulate matter released for the fabrics being cleaned/refreshed. The "effective amount" will vary not only with the type of tackiness agent selected, but also with the load of fibrous/particulate matter being handled. However, such amounts can be determined by routine experimentation in light of the disclosures herein. The tackiness agent can be applied using any convenient technique such as spraying, rolling, padding, and the like.

Cleaning/Refreshment Compositions—The user of the present process can employ various cleaning/refreshment compositions to practice the invention. However, one potential problem associated with many known fabric treatment compositions is their tendency to leave visible residues on fabric surfaces. Such residues are problematic and are preferably to be avoided herein since the present process does not involve conventional immersion or rinse steps. Accordingly, the compositions used herein should, most preferably, be substantially free of various gelling agents, polyacrylate-based emulsifiers, polymeric anti-static agents, inorganic builder salts and other residue-forming materials, except at low levels of about 0.1%–0.3%, and preferably 0%, of the final compositions. Water used in the compositions should preferably be distilled, deionized or otherwise rendered free of residue-forming materials. Stated otherwise the compositions herein should preferably be formulated so as to leave substantially no visible residue on fabrics or other solid surfaces being treated according to the practice of this invention.

Aqueous Compositions (a) Water—The preferred, low residue compositions herein may comprise from about 90%, preferably from about 95.5% to about 99.9%, by weight, of water.

(b) Surfactant—The compositions herein preferably comprise from about 0.05% to about 2%, by weight, of surfactants, especially nonionics such as the ethoxylated $C_{10}$–$C_{16}$ alcohols, e.g., NEODOL 23-6.5.

(c) Optionals—The compositions herein may comprise minor amounts of various optional ingredients, including preservatives, bleach stabilizers, perfumes, pH adjusters, buffers, and the like. If used, such optional ingredients will typically comprise from about 0.05% to about 2%, by weight, of the compositions, having due regard for residues on the cleaned fabrics.

The following illustrates preferred ranges for cleaning/refreshment compositions for use herein, but is not intended to be limiting thereof.

| Ingredient | % (wt.) Formula Range |
|---|---|
| Surfactant | 0–2 |
| Perfume | 0–1.5 |
| Water | Balance |
| pH range from about 5 to about 8. | |

Preferred compositions for use in the in-dryer cleaning/refreshment process herein are as follows.

| Ingredient | % (wt.) | Range (% wt.) |
|---|---|---|
| Water | 99.0 | 95.1–99.9 |
| Perfume | 0.5 | 0–1.5 |
| Surfactant* | 0.5 | 0.05–2.0 |
| Ethanol or Isopropanol | 0 | Optional to 4% |

*Especially ethoxylated alcohols, as disclosed herein. Commercial surfactants available as TWEEN ®, SPAN ®, AEROSOL OT ® and various sulfosuccinic esters are especially useful herein.

Perfume—It has been determined that higher molecular weight, high boiling point, malodorous chemicals tend to be retained on the fabrics, at least to some degree. These malodors can be overcome, or "masked", by perfumes. Accordingly, it will be appreciated that the perfumer should select at least some perfume chemicals which are sufficiently high boiling that they are not entirely lost during the process. A wide variety of aldehydes, ketones, esters, acetals, and the like, perfumery chemicals which have boiling points above about 50° C., preferably above about 85° C., are known. Such ingredients can be delivered to the fabrics being treated by means of the carrier substrate herein during the processes herein, thereby helping to reduce the user's perception of malodors. Non-limiting examples of perfume materials with relatively high boiling components include various essential oils, resinoids, and resins from a variety of sources including but not limited to orange oil, lemon oil, patchouli, Peru balsam, Olibanum resinoid, styrax, labdanum resin, nutmeg, cassia oil, benzoin resin, coriander, lavandin and lavender. Still other perfume chemicals include phenyl ethyl alcohol, terpineol and mixed pine oil terpenes, linalool, linalyl acetate, geraniol, nerol, 2-(1,1-dimethylethyl)-cyclohexanol acetate, orange terpenes and eugenol. Of course, lower boiling materials can be included, with the understanding that some loss will occur due to venting.

Containment Bag—The compositions are loaded on the carrier substrate which is encased in the coversheet and the finished article is preferably stored in a pouch until time-of-use. The article is then placed in a bag environment for use in a heated operating clothes dryer, or the like, to treat fabrics as a dry cleaning alternative or fabric refreshment process. The warm, humid environment created inside this bag volatilizes malodor components in the manner of a "steam distillation" process, and moistens fabrics and the soils thereon. This moistening of fabrics can loosen pre-set wrinkles, but it has now been discovered that overly wet fabrics can experience setting of new wrinkles during the drying stage toward the end of the dryer cycle. Proper selection of the amount of water used in the process and, importantly, proper venting of the bag in the present manner can minimize wrinkling. Moreover, if the bag is not vented, the volatilized malodorous materials removed from the fabrics can undesirably be re-deposited thereon.

In a highly preferred mode, the process of the present invention employs a vapor-venting containment bag. The bag is preferably designed for multiple uses and reuses, and is especially adapted for use by the consumer in any conventional hot air clothes dryer apparatus, such as those found in the home or in commercial laundry/cleaning establishments. The bag is designed to vent water and other vapors (including malodorous materials) which emanate from within the bag when used in the manner described herein. The vapors released from the bag are thence exhausted through the air vent of the dryer apparatus.

The preferred venting bag is provided with a vapor-venting closure which provides one or more gaps through which vapors are released from the bag, in-use. In a preferred embodiment, the size of this gap is selected to provide controlled vapor release from the bag under the indicated operating conditions. While other gap sizes and operating conditions can be used, a preferred balance between vapor containment within the bag to perform the sanitization of the fabrics along with the cleaning/refreshment function and vapor release from the bag has now been determined using the principles disclosed hereinafter.

Alternatively, the bag can be provided with a series of holes or other fenestrations which provide vapor venting. However, such venting is not as effective as the vapor-venting closure.

In one mode, the present invention employs a vapor-venting containment bag comprising an open end, a closed end and flexible side walls having inner and outer surfaces, the open end of the bag having a section of one side wall extending beyond the open end to provide a flexible flap, the flap having first fastening device affixed thereto, the flap being foldable to extend over a portion of the outside surface of the opposing side wall, the flap being affixable to the outer surface of the opposing wall of the bag by engaging the first fastening device on the inside face of the flap with a second fastening device present on the outside face of the opposing side wall, the first and second fastening devices, when thus engaged, forming a fastener, thereby providing a closure for the open end of the bag. The first and second fastening devices are disposed so as, when engaged, to provide vapor-venting along the closure, especially at the lateral edges of the closure. The bag herein is most preferably formed from film which is heat resistant up to at least about 204° C.–260° C. Nylon is a preferred film material for forming the bag. In another embodiment, the edge of one wall of the bag is notched along a substantial portion of its width to facilitate and optimize vapor venting.

In an alternate mode, the flap can be folded to provide the closure, tucked inside the opposing side wall, and secured there by a fastener. In this mode, vapors are vented along the closure and especially at the lateral edges of the closure. In yet another mode, the side walls are of the same size and no flap is provided. Fastening devices placed intermittently along portions of the inner surfaces of the side walls are engaged when the lips of the side walls are pressed together to provide closure. One or more vapor-venting gaps are formed in those regions of the closure where no fastening device is present.

While the fastening devices herein can comprise chemical adhesives, the bag is preferably designed for multiple uses. Accordingly, reusable mechanical fasteners are preferred for use herein. Any reusable mechanical fastener or fastening means can be used, as long as the elements of the fastener can be arranged so that, when the bag is closed and the fastener is engaged, a vapor-venting closure is provided. Non-limiting examples include: bags wherein the first and second fastening devices, together, comprise a hook and loop (VELCRO®-type) fastener; hook fasteners such as described in U.S. Pat. No. 5,058,247 to Thomas & Blaney issued Oct. 22, 1991; bags wherein the first and second fastening devices, together, comprise a hook and string type fastener; bags wherein the first and second fastener devices, together, comprise an adhesive fastener; bags wherein the first and second fastening devices, together, comprise a toggle-type fastener; bags wherein the first and second fastening devices, together, form a snap-type fastener; as well as hook and eye fasteners, ZIP LOK®-style fasteners, zipper-type fasteners, and the like, so long as the fasteners are situated so that vapor venting is achieved. Other fasteners can be employed, so long as the vapor-venting is maintained when the bag is closed, and the fastener is sufficiently robust that the flap does not open as the bag and its contents are being tumbled in the clothes dryer. The fastening devices can be situated that the multiple vapor-venting gaps are formed along the closure, or at the lateral edges, or so that the gap is offset to one end of the closure. In yet another embodiment, both ends of the bag are provided with a vapor venting closure.

The design of the venting ability of the bag achieves a proper balance of the above effects. A tightly-sealed, vapor impermeable "closed" bag will not purge malodors and will overly moisten the fabrics, resulting in wrinkling. An overly "open" bag design will not sufficiently moisten the fabrics or soils to mobilize heavier malodors or to remove pre-existing fabric wrinkles. Further, the bag must be "closed" enough to billow and create a void volume under water vapor pressure, wherein the fabrics can tumble freely within the bag and be exposed to the vapors.

The bag is designed with sufficient venting to trap a portion of water vapors (especially early in the dryer cycle) but to allow most of the water to escape by the end of the cycle. Said another way, the rate of vapor release is, preferably, optimized to secure a balance of vapor venting and vapor trapping. A preferred bag design employs a water vapor impermeable film such as nylon, with a the closure flap (preferably with a hook-and-loop VELCRO®-type fastener) like that of a large envelope. The degree of slack in the fold-over portion of the closure flap can be varied to provide a vapor-venting air gap or partial opening which controls the rate of vapor venting from of the bag. In another mode, a notch is cut along the edge of the side wall opposite the flap to further adjust the venting. The fastener devices shown in the Figures run only partly along the closure, thereby allowing venting to also occur at the lateral edges of the closure.

The following is intended to assist the formulator in the manufacture and use of vapor-venting bags in the manner of this invention, but is not intended to be limiting thereof.

Bag Dimensions—FIG. 4 shows the overall dimensions of a notched bag: i.e., length (7) to fold line 27⅝ inches (70.2 cm); width (8) of bag 26 inches (66 cm), with a flap to the base of the fold line (11) of 2⅜ inches (6 cm). In the Tests reported hereinafter, this bag is referred to by its open dimensions as "26 in.×30 in." (66.04 cm×76.20 cm).

FIG. 5 gives additional details of the positioning of the various elements of the notched bag. In this embodiment, all dimensions are the same for both the left hand and right hand sides of the bag. The dimensions herein are for an opened bag which is about 30 inches (76.2 cm) in overall length (including the flap) and about 26 inches (66 cm) wide. The distance (9) from the lateral edge of the bag to the outermost edge of the fastening device (3) located on the inside of the flap (5) is about 2 inches (5 cm). In this embodiment, the fastening device (3) on the inside of wall (2a) comprises the loop portion of a VELCRO®-type strip whose width (13) is about 0.75 inches (1.9 cm) and whose total length is about 22 inches (55.9 cm). Fastening device (6) is similarly situated on the outside of wall 2(b) and comprises the hook portion of a ¾ inch (1.9 cm) VELCRO®-type strip. Distance (9) can be decreased or increased to decrease or increase venting at the edges of the flap when the bag is closed and the fastener is engaged. The distance (10) between the uppermost edge of the flap and the base of the notch is about 2⅞ inches (7.3 cm). The distance (14) between the lateral edge of the bag and the lateral edge of the notch is about 0.25 inches (0.64 cm). The distance (15) between the uppermost edge of the flap and the fold (11) is about 2⅜ inches (6 cm). The distance (16) between the uppermost edge of the flap and the leading edge of the VELCRO®-type strip (3) affixed to the flap is about ⅜ inches (0.95 cm). The distance (17) between fold (11) and the lowermost edge of the notch is about ½ inch (1.27 cm). This distance also can be varied to decrease or increase vapor venting. A range of 0.25–1.5 inches (0.64–3.81 cm) is typical. The distance (18) between the uppermost edge of the VELCRO®-type strip (6) and the bottom edge of the notch is about ¾ inches (1.9 cm). The distance (19) between the bottommost edge of the VELCRO®-type strip (3) and the fold (11) is about 1¼ inches (3.17 cm).

Figure 6:
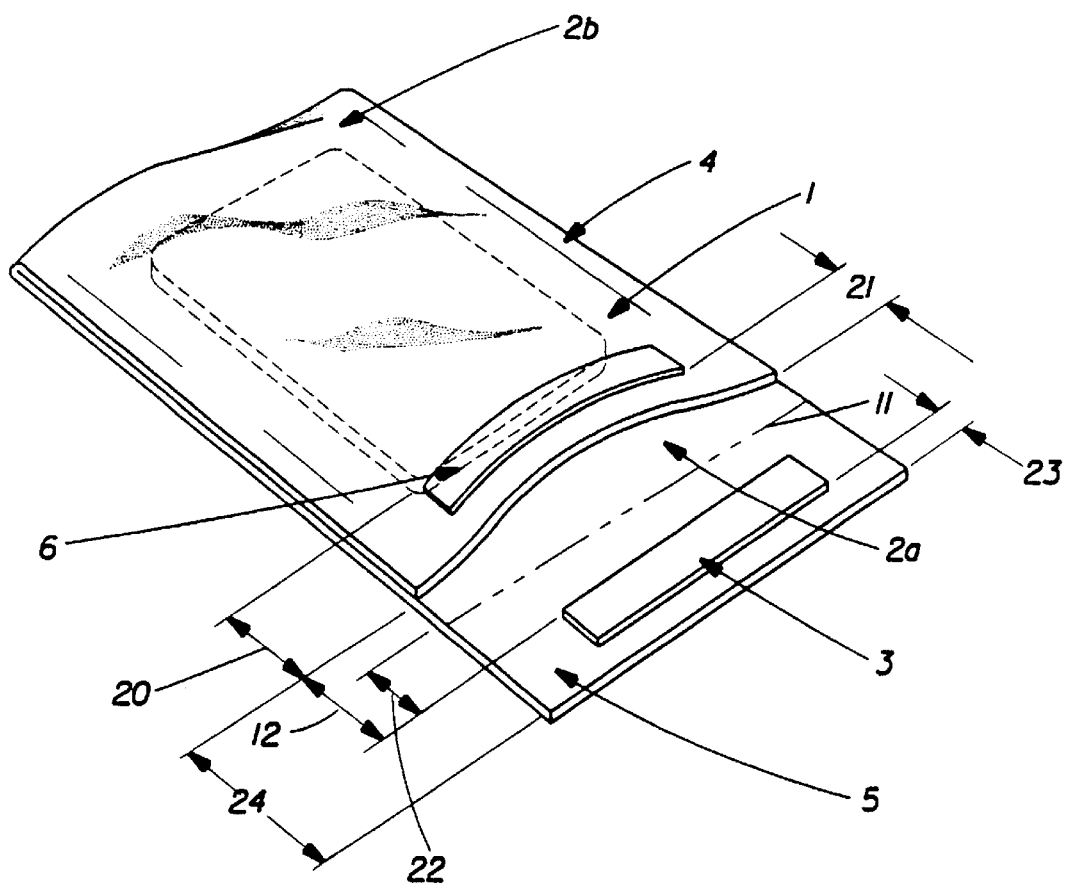
FIG. 6 is a perspective of an un-notched vapor-venting bag containing a loose cleaning/refreshment article of the present invention.

FIG. 6 gives additional details of the dimensions of an un-notched envelope bag of the foregoing overall size comprising sidewalls (2a) and (2b). Again, each VELCRO®-type strip (3) and (6) is about ¾ inches (1.9 cm) in width and about 22 inches (55.9 cm) in length. Each strip is positioned so as to be inboard from each of the lateral edges of the finished bag wall and flap by about 2 inches (5 cm). The distance (12) between the leading edge of the sidewall (2b) to the base edge of the fastener strip (3) on the flap portion of the bag is about 2½ inches (6.35 cm). The distance (20) between the base edge of the fastener strip (6) to the leading edge of the sidewall (2b) is about 2.25 inches (5.7 cm). The distance (21) between the leading edge of the fastener strip (6) to the leading edge of the sidewall is about 1⅜ inches (3.5 cm). The distance (22) between fold (11) and the base edge of the fastener strip (3) is about 2 inches (5 cm). The distance (23) between the leading edge of fastener strip (3) and the uppermost edge of the flap which is an extension of sidewall (2a) is about 0.25 inches (0.64 cm). Distance (24) is about 3⅝ inches (9.2 cm). As in the foregoing notched bag, the positioning and length of the fasteners can be adjusted to decrease or increase venting.

The construction of the preferred, heat-resistant vapor-venting bag used herein to contain the fabrics in a hot air laundry dryer or similar device preferably employs thermal resistant films to provide the needed temperature resistance to internal self-sealing and external surface deformation sometimes caused by overheated clothes dryers. In addition, the bags are resistant to the chemical agents used in the cleaning or refreshment compositions herein. By proper selection of bag material, unacceptable results such as bag melting, melted holes in bags, and sealing of bag wall-to-wall are avoided. In a preferred mode, the fastener is also constructed of a thermal resistant material. As shown in the Figures, in one embodiment, 1 to 3 mil (0.025–0.076 mm) heat-resistant Nylon-6 film is folded and sealed into a containment bag. Sealing can be done using standard impulse heating equipment. In an alternate mode, a sheet of nylon is simply folded in half and sealed along two of its edges. In yet another mode, bags can be made by air blowing operations. The method of assembling the bags can be varied, depending on the equipment available to the manufacturer and is not critical to the practice of the invention.

The dimensions of the containment bag can vary, depending on the intended end-use. For example, a relatively smaller bag can be provided which is sufficient to contain one or two silk blouses. Alternatively, a larger bag suitable for handling a man's suit can be provided. Typically, the bags herein will have an internal volume of from about 10,000 cm$^3$ to about 25,000 cm$^3$. Bags in this size range are sufficient to accommodate a reasonable load of fabrics (e.g., 0.2–5 kg) without being so large as to block dryer vents in most U.S.-style home dryers. Somewhat smaller bags may be used in relatively smaller European and Japanese dryers.

The bag herein is preferably flexible, yet is preferably durable enough to withstand multiple uses. The bag also preferably has sufficient stiffness that it can billow, in-use, thereby allowing its contents to tumble freely within the bag during use. Typically, such bags are prepared from 0.025 mm to 0.076 mm (1–3 mil) thickness polymer sheets. If more rigidity in the bag is desired, somewhat thicker sheets can be used.

In addition to thermally stable "nylon-only" bags, the containment bags herein can also be prepared using sheets of co-extruded nylon and/or polyester or nylon and/or polyester outer and/or inner layers surrounding a less thermally suitable inner core such as polypropylene. In an alternate mode, a bag is constructed using a nonwoven outer "shell" comprising a heat-resistant material such as nylon or polyethylene terephthalate and an inner sheet of a polymer which provides a vapor barrier. The non-woven outer shell protects the bag from melting and provides an improved tactile impression to the user. Whatever the construction, the objective is to protect the bag's integrity under conditions of thermal stress at temperatures up to at least about 400–500° F. (204° C. to 260° C.). Under circumstances where excessive heating is not of concern, the bag can be made of polyester, polypropylene or any convenient polymer material.

Vapor Venting Evaluation—In its broadest sense, the preferred vapor-venting containment bag used herein is designed to be able to vent at least about 40%, preferably at least about 60%, up to about 90%, preferably no more than about 80%, by weight, of the total moisture introduced into the bag within the operating cycle of the clothes dryer or other hot air apparatus used in the process herein. (Of course most, if not all, of organic cleaning solvents, if any, will also be vented during together with the water. However, since water comprises by far the major portion of the cleaning/refreshment compositions herein, it is more convenient to measure and report the venting as water vapor venting.)

It will be appreciated by those knowledgeable about the operation of hot air clothes dryers and similar apparatus that the rate of venting will usually not be constant over the entire operating cycle. All dryers have a warm-up period at the beginning of the operating cycle, and this can vary according to the specifications of the manufacturer. Most dryers have a cool-down period at the end of the operating cycle. Some venting from the containment bag can occur during these warm-up and cool-down periods, but its rate is generally less than the venting rate over the main period of the drying cycle. Moreover, even during the main period of the cycle, many modern dryers are constructed with thermostat settings which cause the air temperature in the dryer to be increased and decreased periodically, thereby preventing overheating. Thus, an average, rather than constant, dryer operating temperature in the target range of from about 50° C. to about 85° C. is typically achieved.

Moreover, the user of the present containment bag may choose to stop the operation of the drying apparatus before the cycle has been completed. Some users may wish to secure fabrics which are still slightly damp so that they can be readily ironed, hung up to dry, or subjected to other finishing operations.

Apart from the time period employed, the Vapor-Venting Equilibrium ("VVE") for any given type of vapor-venting closure will depend mainly on the temperature achieved within the dryer—which, as noted above, is typically reported as an average "dryer air temperature". In point of fact, the temperature reached within the containment bag is more significant in this respect, but can be difficult to measure with accuracy. Since the heat transmittal through the walls of the bag is rather efficient due to the thinness of the walls and the tumbling action afforded by conventional clothes dryers, it is a reasonable approximation to measure the VVE with reference to the average dryer air temperature.

Moreover, it will be appreciated that the vapor-venting from the containment bag should not be so rapid that the aqueous cleaning/refreshment composition does not have the opportunity to moisten the fabrics being treated and to mobilize and remove the soils/malodors therefrom. However, this is not of practical concern herein, inasmuch as the delivery of the composition from its carrier substrate onto the fabrics afforded by the tumbling action of the apparatus occurs at such a rate that premature loss of the composition by premature vaporization and venting is not a significant factor. Indeed, the preferred bag herein is designed to prevent such premature venting, thereby allowing the liquid and vapors of the cleaning/refreshment composition to remain within the bag for a period which is sufficiently long to perform its intended functions on the fabrics being treated.

The following Vapor-Venting Evaluation Test (VVET) illustrates the foregoing points in more detail. Larger or smaller containment bags can be used, depending on the volume of the dryer drum, the size of the fabric load, and the like. As noted above, however, in each instance the containment bag is designed to achieve a degree of venting, or VVE "score", of at least about 40% (40 VVE), preferably at least about 60% (60 VVE), up to about 90% (90 VVE). WO 97/27354 to Greene, Rogers, Saslow, Wise and You, incorporated herein by reference, provides graphical figures illustrating the vapor venting of the bag.

Vapor-Venting Evaluation Test

Materials:

Envelope or "Standard", i.e., Control Containment Bag to be evaluated for VVE.

Carrier Substrate (15"×11"; 38.1 cm×27.9 cm) HYDRASPUN® carrier substrate sheet from Dexter with (10444) or without (10244) Binder Wool Blouse: RN77390, Style 12288, Weight approx. 224 grams Silk Blouse: RN40787, Style 0161, Weight approx. 81 grams Rayon Swatch: 45"×17" (114.3 cm×43.2 cm), Weight approx. 60 grams Pouch: 5"×6.375" (12.7 cm×16.2 cm) to contain the Carrier Substrate and water De-ionized Water; Weight is variable to establish VVE.

Pretreatment of Fabrics:

1. The wool, silk, and rayon materials are placed in a Whirlpool dryer (Model LEC7646DQO) for 10 minutes at high heat setting, with the heating cycle ranging from about 140° F.–165° F. to remove moisture picked up at ambient condition.
2. The fabrics are then removed from the dryer and placed in sealed nylon or plastic bags (minimum 3 mil. thickness) to minimize moisture pick up from the atmosphere.

Test Procedure:

1. Water of various measured weights from 0 to about 40 grams is applied to the carrier substrate a minimum of 30 minutes before running a vented bag test. The substrate is folded, placed in a pouch and sealed.
2. Each fabric is weighed separately and the dry weights are recorded. Weights are also recorded for the dry carrier substrate, the dry pouch containing the substrate, and the dry containment bag being evaluated.
3. Each garment is placed in the bag being evaluated for vapor venting along with the water-containing substrate (removed from its pouch and unfolded).
4. The bag is closed without expressing the air and placed in the Whirlpool Dryer for 30 minutes at the high heat setting, with tumbling per the standard mode of operation of the dryer.
5. At the end of 30 minutes the bag is removed from the dryer and each fabric, the carrier substrate, the bag and the pouch are weighed for water weight gain relative to the dry state. (A possible minor loss in weight for the containment bag due to dryer heat is ignored in the calculations.)
6. The weight gain of each garment is recorded as a percent of the total moisture applied to the carrier substrate.
7. The remaining unmeasured moisture divided by the total moisture is recorded as percent vented from the dryer bag.
8. When a series of total applied moisture levels are evaluated, it is seen that above about 15–20 grams of water the % vented becomes essentially constant, and this is the Vapor-Venting Equilibrium value, or VVE, for the particular bag venting design.

It can be seen from examining a series of VVET results at various initial moisture levels that the water at lower initial levels is being disproportionately captured by the garment load, the headspace, and the nylon bag, such that venting of water and volatile malodors begins in earnest only after the VVE value is achieved. Since this occurs only when about 15–20 grams or more of water is initially charged, it is seen that a VVE of greater than about 40 is needed to avoid excessive wetting of garments, leading to unacceptable wet-setting of wrinkles, as discussed herein.

Malodor and Wrinkle Removal

One assessment of the process using the vapor-venting bag herein with respect to malodors comprises exposing the fabrics to be tested to an atmosphere which contains substantial amounts of cigarette smoke. In an alternate mode, or in conjunction with the smoke, the fabrics can be exposed to the chemical components of synthetic perspiration, such as the composition available from IFF, Inc. Expert olfactory panelists are then used to judge odor on any convenient scale. For example, a scale of 0 (no detectable odor) to 10 (heavy malodor) can be established and used for grading purposes. The establishment of such tests is a matter of routine, and various other protocols can be devised according to the desires of the formulator.

For example, garments to be "smoked" are hung on clothing hangers in a fume hood where air flow has been turned off and vents blocked. Six cigarettes with filters removed are lighted and set in ashtrays below the garments. The hood is closed and left until the cigarettes have about half burned. The garments are then turned 180° to get even distribution of smoke on all surfaces. Smoking is then continued until all cigarettes are consumed. The garments are then enclosed in sealed plastic bags and allowed to sit overnight.

After aging for about one day, the garments are treated in the cleaning/refreshment process using the venting bag. The garments are removed promptly from the containment bag when the dryer cycle is finished, and are graded for malodor intensity. The grading is done by an expert panel, usually two, of trained odor and perfume graders. The malodor intensity is given a grade of 0 to 10, where 10 is full initial intensity and 0 is no malodor detected. A grade of 1 is a trace detection of malodor, and this grade is regarded as acceptably low malodor to most users.

In the absence of perfume ingredients in the cleaning cloth composition, the grading of residual malodor intensity is a direct indication of degree of cleaning or removal of malodorous chemicals. When perfumed compositions are used, the grading panelists can also determine a score for perfume intensity and character (again on a 0 to 10 scale), and the malodor intensity grading in this case would indicate the ability of the residual perfume to cover any remaining malodorous chemicals, as well as their reduction or removal.

After the garment odor grading taken promptly after the cleaning/refreshment process, the garments are hung in an open room for one hour and graded again. This one-hour reading allows for an end-effect evaluation that would follow cool-down by the garments and drying of the moisture gained in the dryer cycle treatment. The initial out-of-bag grading does reflect damp-cloth odors and a higher intensity of warm volatiles from the bag, and these are not factors in the one-hour grades. Further garment grading can be done at 24 hours and, optionally, at selected later times, as test needs dictate.

Likewise, fabric wrinkles can be visually assessed by skilled graders. For example, silk fabric, which wrinkles rather easily, can be used to visually assess the degree of wrinkle-removal achieved by the present processes using the vapor-venting bag. Other single or multiple fabrics can optionally be used. A laboratory test is as follows.

De-Wrinkling Test

Materials:
  As above for VVET.
  De-ionized Water, Weight range (0–38 grams)
Pretreatment of Fabrics:
  The silk fabric is placed in a hamper, basket, or drum to simulate normal conditions that are observed after wearing. These storage conditions produce garments that are severely wrinkled (well defined creases) and require a moist environment to relax the wrinkles.
Test Procedure:
  1. One silk fabric is placed in a containment bag being tested.
  2. Water (0–38 grams) is applied to the carrier substrate a minimum of 30 minutes before running the test, placed in a pouch and sealed.
  3. The silk garment is placed in the test containment bag along with the water-containing substrate (removed from its pouch and unfolded).
  4. The bag is closed and placed in a Whirlpool Dryer (Model LEC7646DQO) for 30 minutes at high heat (48–74C cycle).
  5. At the end of 30 minutes, the dryer bag is removed from the dryer IMMEDIATELY and the silk garment is placed on a hanger.
  6. The silk garment is then visually graded versus the Control Garment from the same Pretreatment Of Fabrics.

In laboratory tests of the foregoing type, the in-dryer, non-immersion cleaning/refreshment processes herein typically provide malodor (cigarette smoke and/or perspiration) malodor grades in the 0–1 range for smoke and somewhat higher for perspiration malodors, thereby indicating good removal of malodor components other than those of sufficiently high molecular weights that they do not readily "steam vaporize" from the fabrics. Likewise, fabrics (silks) have wrinkles removed to a sufficient extent that they are judged to be reasonably suitable for wearing with little, or no, ironing.

Process Components

The use of the article with the vapor-venting bag, the compositions and the processes of this invention are described in more detail hereinafter. Such disclosure is by way of illustration and not limitation of the invention herein.

FIG. 3 illustrates one form of a pre-formed, notched containment bag in an open configuration with the loose, planar article (1), first side wall (2a), second side wall (2b), first fastening device (3), side seal (4) for the bag and flexible flap (5). In use, flexible flap (5) is folded along fold line (11) to provide the vapor-venting closure for the bag.

FIG. 4 shows the "envelope-style" notched bag in a finished configuration and containing the loose, planar article (1). In-use, the fabrics to be cleaned/refreshed are placed in the bag with the article (1) and flap (5) is folded along fold line (11) to engage first fastening device (3) with the opposing second fastening device (6) to fasten the flap, thereby providing a vapor-venting closure which is sufficiently stable to withstand tumbling in a hot air clothes dryer or similar device.

FIG. 5 shows a cut-away view of the corner of the notched containment bag illustrating the interior of the first side wall (2a) and second side wall (2b), first fastening device (3), second fastening device (6), flap (5), and fold line (11). The distance between the edge of the bag (9) and the depth of the notch (11) in second side wall (2b) are dimensions which are set forth hereinabove.

FIG. 6 depicts an un-notched venting bag with the article (1) loosely contained therein.

As noted above, the Bag Dimensions given hereinabove are for containment bags which are designed to tumble freely within the drum of a conventional, U.S. style in-home hot air clothes dryer having a drum volume of about 170–210 liters (home size). The bag of the stated dimensions is designed to treat up to about 5 kg fabric load in a single use. The dimensions can be adjusted proportionately for larger or smaller bags to achieve the desired VVE and to ensure effective use in dryers with larger or smaller drums. For example, the total volume of a containment bag constructed for use in an average European home clothes dryer (or U.S. "apartment" size; ca. 90 liter drum volume) would be about 60% of the volume for an average U.S. dryer.

Overall Process

The overall process is conveniently conducted in a tumbling apparatus, preferably in the presence of heat. The nylon or other heat-resistant vapor-venting bag with the article herein plus aqueous cleaning/refreshment composition and containing the fabric being treated is closed and placed in the drum of an automatic hot air clothes dryer at temperatures of 40° C.–150° C. The drum is allowed to revolve, which imparts a tumbling action to the bag and agitation of its contents concurrently with the tumbling. By virtue of this agitation, the fabrics come in contact with the article containing the composition. The tumbling and heating are carried out for a period of at least about 10 minutes, typically from about 20 minutes to about 60 minutes. This step can be conducted for longer or shorter periods, depending on such factors as the degree and type of soiling of the fabrics, the nature of the soils, the nature of the fabrics, the fabric load, the amount of heat applied, and the like, according to the needs of the user. During the step, greater than about 40%, typically 40% to about 80%, of the moisture is vented from the bag.

With respect to the wrinkle-removing function of the process and compositions herein, it will be appreciated that wrinkling can be affected by the type of fabric, the fabric weave, fabric finishes, and the like. For fabrics which tend to wrinkle, it is preferred not to overload the vapor-venting bag used herein. Thus, for a bag with, for example, an operational capacity of up to about 5 kg of fabrics, it may be best to process up to only about 60% of capacity, (i.e., up to about 3 kg) of fabrics to further minimize wrinkling.

The following examples further illustrate the invention, but are not intended to be limiting thereof.

EXAMPLE I

A low residue liquid fabric cleaning/refreshment product for use preferably in a vented dryer bag is prepared, as follows.

| Ingredient | % (wt.) |
| --- | --- |
| Emulsifier (TWEEN 20)* | 0.5 |
| Perfume | 0.5 |
| KATHON ®** | 0.0003 |
| Sodium Benzoate | 0.1 |
| Water | Balance |

*Polyoxyethylene (20) sorbitan monolaurate available from ICI Surfactants.
**Preservative A 10¼ in.×14¼ in. (26 cm×36 cm) carrier sheet of HYDRASPUN® is prepared. The carrier sheet is covered on both sides with a topsheet and a bottomsheet of 8 mil (0.2 mm) Reemay fabric coversheet material of the type described hereinabove. The coversheet is coated on its internal surface with about 4000 mg of ELMER'S SPRAY ADHESIVE (or about 6200 mg of 3M's SUPER 77 Spray Adhesive) tackiness agent per square meter. The coversheet (i.e., both topsheet and bottomsheet) are bonded to the carrier sheet by a Vertrod® or other standard heat sealer device, thereby bonding the laminate structure together around the entire periphery of the carrier sheet. The edges of the carrier sheet around its periphery are intercalated between the topsheet and bottomsheet by the bond. The width of the bond is kept to a minimum and is about 0.25 in. (6.4 mm).

The bonded laminate structure thus prepared is rolled somewhat loosely around a cylindrical void into a generally tubular shape of about 26 cm length and a diameter of about 2–3 cm. The rolled article is then folded to half its length at about its mid-point by means of a thrusting blade which also serves to insert the article into a retaining pouch. It is observed that, with the rolling method herein, essentially no severely sharp creases are formed, and the final doubling of the rolled tube is under such stress that only in the very center of the bend are a few sharper creases formed. The result is that permanent refolding along crease lines is essentially avoided, and release of the cleaning/refreshment composition from the article in-use is optimized.

Any plastic or flexible pouch which does not leak is suitable for use herein. For example, a foil laminated pouch of the type used in the food service industry can be employed. Such pouches are well-known in the industry and are made from materials which do not absorb food flavors. In like manner, the formulator herein may wish to avoid absorption of the perfume used in the cleaning/refreshment composition by the pouch. Various pouches are useful herein and are commercially available on a routine basis. As a point of comparison, the pouch containing the rolled/folded article herein has overall dimensions of about 8.5 cm×17.7 cm, whereas a pouch for a similar planar-folded article is about 13 cm×17.7 cm. A savings in material of about 30–40% is thus achieved.

20 Grams of the liquid product are poured onto the article within the pouch and allowed to absorb into it for a minimum of 30 minutes, preferably for at least about 4 hours. The pouch is sealed immediately after the liquid product is introduced into the pouch and stored until time-of-use.

As an entirely optional matter, and in addition to the texture imparting indentations discussed above, the carrier sheet can also have holes punched therethrough in order to further maximize its ability to maintain an open configuration in-use. Indeed, the holes can be punched through the entire article, including the coversheet, itself. For an article having the overall dimensions of about 27 cm×37 cm, 16 round holes, each about 0.5 in. (1.27 cm) in diameter are evenly spaced across the HYDRASPUN carrier sheet. Slits or other perforations may be used in like manner.

The fabric to be treated is placed into a 26 in.×30 in. (66×76 cm) vapor-venting nylon bag as shown in the Figures together with the article (which is removed from its storage pouch, unfolded and unrolled) releasably containing the aforesaid cleaning/refreshment product. The mouth of the bag is closed to provide vapor-venting, and the bag and its contents are placed in the drum of a conventional hot air clothes dryer. The dryer is operated in standard fashion for 20–60 minutes at a high heat setting (an air temperature range of about 140–170° F.; 60–70° C.). After the tumbling action of the dryer ceases, the cleaned and refreshed fabric is removed from the bag. Lint from the fabric is removed therefrom and is retained by the coversheet. The used article is discarded. The fabric (which is preferably still slightly damp) is preferably hung on a conventional hanger to complete the drying process thereby further avoiding wrinkles.

It will be understood that the articles herein can be modified without departing from the spirit and scope of this invention. For example, one variation that can make the substrate a bit easier to fold and insert into the pouch is to elongate the spiral fold pattern out, such that the rolled fabric resembles a "bolted" roll of fabric. This bolting reduces the number of cross-sectional layers versus a circular spiral, thus causing less bunching and bulging along the center fold. Another variation is to fold the substrate first, preferably along its longest dimension, and then "bolt" or roll it. This pattern and the internal bunching of the layers produce a "springiness" to help keep the spiral pattern pushed open and prevent the folds from reforming in-use. All such variations are encompassed by the terms "roll" or "rolled", as used herein. Alternatively, the rolled article can be folded into thirds, rather than half, to further minimize the use of packaging materials. Various logos, patterns, colors, and the like can be used to enhance the appearance of the articles.

EXAMPLE II

High water content cleaning/refreshment compositions for use in the process herein are as follows. The compositions are used in the manner disclosed hereinabove to clean and refresh fabrics.

| Components | Percent | Range (%) | Function |
| --- | --- | --- | --- |
| Water De-ionized | 98.8997 | 97–99.9 | Vapor Phase Cleaning |
| TWEEN 20 | 0.50 | 0.5–1.0 | Wetting Agent, Emulsifier for Perfume |
| Perfume | 0.50 | 0.1–1.50 | Scent, Aesthetics |
| KATHON CG* | 0.0003 | 0.0001–0.0030 | Anti-bacterial |
| Sodium Benzoate* | 0.10 | 0.05–1.0 | Anti-fungal |

*Optional preservative ingredients.

20–30 Grams, preferably about 20 grams, of the Sweet Water composition are absorbed into a 28 cm×38 cm HYDRASPUN® carrier sheet (the sheet is preferably not "dripping" wet). The sheet is covered with the fibrous coversheet whose internal (or, optionally, external) surface is coated with about 6200 mg of SUPER 77 (or about 4000 mg of ELMER'S SPRAY ADHESIVE) tackiness agent per meter². The article is folded for storage. The article is unfolded and used in the foregoing manner to clean and refresh fabrics in a hot air clothes dryer.

Auxiliary Cleaning Agents—In addition to the other ingredients, the foregoing liquid compositions can contain enzymes to further enhance cleaning performance. Lipases, amylases and protease enzymes, or mixtures thereof, can be used. If used, such enzymes will typically comprise from about 0.001% to about 5%, preferably from about 0.01% to about 1%, by weight, of the composition. Commercial detersive enzymes such as LIPOLASE, ESPERASE, ALCALASE, SAVINASE and TERMAMYL (all ex. NOVO) and MAXATASE and RAPIDASE (ex. International Bio-Synthesis, Inc.) can be used.

If an antistatic benefit is desired, the compositions used herein can contain an anti-static agent. If used, such anti-static agents will typically comprise at least about 0.5%, typically from about 2% to about 8%, by weight, of the compositions. Preferred anti-stats include the series of sulfonated polymers available as VERSAFLEX 157, 207, 1001, 2004 and 7000, from National Starch and Chemical Company.

Cleaning solvents, e.g., butoxy propoxy propanol and spreading agents such as 1,2-octanediol can optionally comprise up to about 5%, by weight, of the compositions.

What is claimed is:

1. An article for treating fabrics comprising:
   a) an absorbent substrate;
   b) a liquid cleaning/refreshment composition releasably absorbed in the substrate; the substrate being wholly or partly covered by;
   c) a coversheet which is permeable to the cleaning/refreshment composition in the liquid and/or vapor state, the coversheet having an external surface and an internal surface,
      i. wherein the internal surface of the coversheet is bonded to the absorbent substrate around the periphery of the article and in a manner such that less than the entire coversheet is bonded to the absorbent substrate; and
      ii. wherein the article further comprises a tackiness agent that is present on the external surface of the coversheet or on the internal surface of the coversheet in areas where the internal surface of die coversheet is not bonded to the absorbent substrate or on the absorbent substrate in areas where the internal surface of the coversheet is not bonded to the absorbent substrate wherein the tackiness agent is in an unactivated state such that it does not bond the coversheet to the absorbent substrate until subjected to elevated temperatures.

2. An article according to claim 1, wherein the tackiness agent is on the internal surface of the coversheet.

3. An article according to claim 1 wherein the coversheet is fibrous.

4. An article according to claim 1 wherein the coversheet is an apertured formed film.

5. An article according to claim 1 wherein the tackiness agent is on the surface of the absorbent substrate.

6. An article according to claim 1 wherein the cleaning/refreshment composition comprises water and a member selected from the group consisting of organic surfactants, organic solvents, auxiliary cleaning agents, and mixtures thereof.

7. An article according to claim 1 wherein the cleaning/refreshment composition comprises water and a surfactant.

8. An article according to claim 7 wherein the surfactant is a nonionic surfactant.

9. An article according to claim 8 wherein the cleaning/refreshment composition comprises a mixture of water and a surfactant which is an ethoxylated alcohol, ethoxylated alkyl phenol or ethoxylated sorbitan fatty acid ester.

10. A process for cleaning and refreshing a fabric, comprising contacting the fabric with an article according to claim 1.

11. A process according to claim 10 which is conducted in a vapor-venting bag in a hot air clothes dryer.

12. An article for treating fabrics, comprising:
   a) an absorbent substrate having a first surface and a second surface;
   b) a liquid cleaning/refreshment composition releasably absorbed in the substrate;
   c) the substrate having a texture imparting pattern of indentations on at least one of the surfaces, the substrate being wholly or partly covered by;
   d) a coversheet which is permeable to the cleaning/refreshment composition in the liquid and/or vapor state, the coversheet having an external surface and an internal surface,
      i. wherein the internal surface of the coversheet is bonded to the absorbent substrate around the periphery of the article and in a manner such that less than the entire coversheet is bonded to the absorbent substrate; and
      ii. wherein the article further comprises a tackiness agent that is present on the external surface of the coversheet or on the internal surface of the coversheet in areas where the internal surface of the coversheet is not bonded to the absorbent substrate or on the absorbent substrate in areas where the internal surface of the coversheet is not bonded to the absorbent substrate wherein the tackiness agent is in an unactivated state such that it does not bond the coversheet to the absorbent substrate until subjected to elevated temperatures.

* * * * *